United States Patent [19]

Takahashi

[11] Patent Number: 4,763,149
[45] Date of Patent: Aug. 9, 1988

[54] CAMERA STATUS DISPLAY DEVICE
[75] Inventor: Akira Takahashi, Kanagawa, Japan
[73] Assignee: Ricoh Company, Ltd., Tokyo, Japan
[21] Appl. No.: 94,095
[22] Filed: Sep. 4, 1987

Related U.S. Application Data
[63] Continuation of Ser. No. 786,945, Oct. 11, 1985, abandoned.

[30] Foreign Application Priority Data
Oct. 11, 1984 [JP] Japan ................................ 59-212948

[51] Int. Cl.⁴ ............................................. G03B 17/36
[52] U.S. Cl. ..................................................... 354/217
[58] Field of Search .......................................... 354/217

[56] References Cited
U.S. PATENT DOCUMENTS
4,269,494 5/1981 Shiozawa et al. .............. 354/484 X
4,432,628 2/1984 Sakwada et al. ............... 354/217 X
4,547,770 10/1985 Suzuki et al. ................... 354/468 X Primary Examiner—Michael L. Gellner
Attorney, Agent, or Firm—Oblon, Fisher, Spivak, McClelland & Maier

[57] ABSTRACT

A camera status display device containing an integrated circuit. When a digital signal voltage applied to the integrated circuit exceeds a predetermined voltage, the integrated circuit consumes additional current by passing it through a resistance. This prevents the excess current from flowing to an external circuit. The consuming circuit includes a pair of inverters for each digital signal input. In one embodiment, a resistor is connected to the common point of the pair of inverters. In a second embodiment, an AND gate is connected to each of the common points and a resistance is connected to the output of the AND gate.

2 Claims, 12 Drawing Sheets

F I G. 20
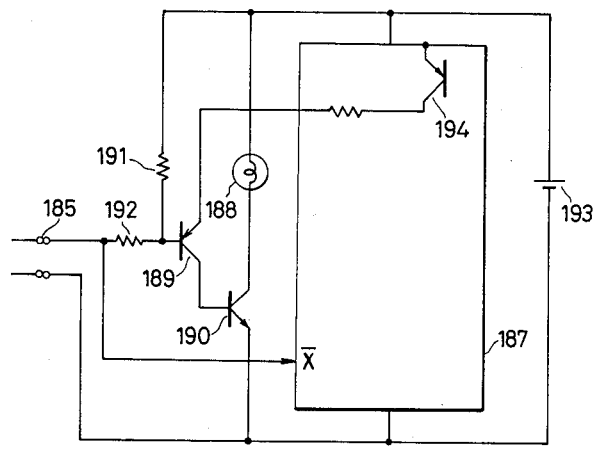

CAMERA STATUS DISPLAY DEVICE

This application is a continuation of application Ser. No. 786,945 filed on Oct. 11, 1985 now abandoned.

BACKGROUND OF THE INVENTION

The present invention relates to a camera status display device.

FIG. 22 of the accompanying drawings schematically illustrates a conventional electronic camera circuit. The electronic camera circuit has a power supply 1 composed of a battery for supplying a voltage of 3V which is converted by a regulator 2 into a constant voltage of 1.5V, which is applied to a CMOS LSI circuit 3 and a backup capacitor 4. The CMOS LSI circuit 3 is responsive to input signals supplied from various components in the camera for enabling a liquid crystal display 5 to display various camera statuses. When a main switch 6 is turned on, the voltage from the power supply 1 is applied to an automatic focusing/exposure control unit 7. When a stroboscopic flash switch 8 is turned on, the voltage of the power supply 1 is applied to a stroboscopic flash 9. The flash signal from the stroboscopic flash switch 8 is fed through a resistor 21 to the CMOS LSI circuit 3. The camera circuit also includes a motor circuit composed of a film winding switch 10, two ganged film rewinding switches 11, 12, a film detecting switch 13, and a motor 14, the motor circuit being devised by the present inventor. Signals delivered from the terminals of the motor 14 and indicative of the rotation and its direction of the motor 14 are fed through resistors 22, 23 to the CMOS LSI circuit 3. When the film is to be wound, the film winding switch 10 is turned on to rotate the motor 14 in a normal direction for winding the film and charging a shutter mechanism. When the film is to be rewound, the film detecting switch 13 and the rewinding switches 11, 12 are turned on to reverse the motor for rewinding the film. The CMOS LSI circuit 3 has protective diodes 15 through 20 connected between input terminals and power supply terminals, and common terminals. The regulator 2 serves to control the current flowing in one direction for generating the constant voltage of 1.5V. When the battery 1 is used up, the CMOS LSI circuit 3 is energized by the backup capacitor 4.

In the illustrated electronic camera circuit, the power supply voltage for the CMOS LSI circuit 3 is 1.5V, whereas the input voltage for the CMOS LSI circuit 3 is 3V. Since the regulator 2 for producing the constant voltage of 1.5V generally allows the current to flow in only one direction, but fails to absorb a current in the opposite direction, the input signal voltage for the CMOS LSI circuit 3 is higher than the power supply voltage for the CMOS LSI circuit 3, thus charging the backup capacitor 4 through the protective diodes 15–17 to increase the power supply voltage for the CMOS LSI circuit 3. For example, when the terminal of the motor 14 coupled to the rewinding switch 11 goes high in level upon normal rotation of the motor 14, a current I1 flows back through the protective diode 15 to the power supply for the CMOS LSI circuit 3. If the current I1 is larger than a current I2 consumed by the CMOS LSI circuit 3, then an excess current (I1-I2) charges the backup capacitor 4 to increase the power supply voltage for the CMOS LSI 3. Where I2=2 microamperes and the resistor 22 has a resistance of 0.5 Megohm, then the current I1 is approximately 4.6 microamperes.

One solution to the above problem is to slice each input signal voltage for the CMOS LSI circuit 3 with a zener diode 24 for preventing the current I2 from flowing back, as shown in FIG. 23. However, this solution is disadvantageous in that a current I3 flowing through the zener diode 24 is wasteful, and the zener diode 24 required to be connected exteriorly to the CMOS LSI circuit 3 results in an increased cost and a greater number of parts required.

FIG. 24 shows another solution in which the level of each input signal voltage for the CMOS LSI circuit 3 is shifted by a zener diode 25 for preventing the current I2 from flowing back. The problem with this design is that when the input signal voltage varies to a lower level, the input signal voltage for the CMOS LSI circuit 3 cannot be kept at a high level, and use of the zener diode 25 increases the cost.

SUMMARY OF THE INVENTION

It is an object of the present invention to provide a camera status display device which has an integrated circuit that will not be subject to voltage variations which would be caused by input signals, which is less costly and made up of a smaller number of parts, and which can maintain a desired input signal level for the integrated circuit.

Another object of the present invention is to provide a camera status display device capable of displaying a reduction in the voltage of a battery below a prescribed level which indicates that the service life of the battery is about to be terminated.

Still another object of the present invention is to provide a camera status display device for successively displaying camera statuses when the device is set in a display mode.

A still further object of the present invention is to provide a camera status display device which can display the condition of film transport.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 20 is a block diagram of a dating mechanism in the electronic camera circuit;

DESCRIPTION OF THE PREFERRED EMBODIMENTS

Figure 2:
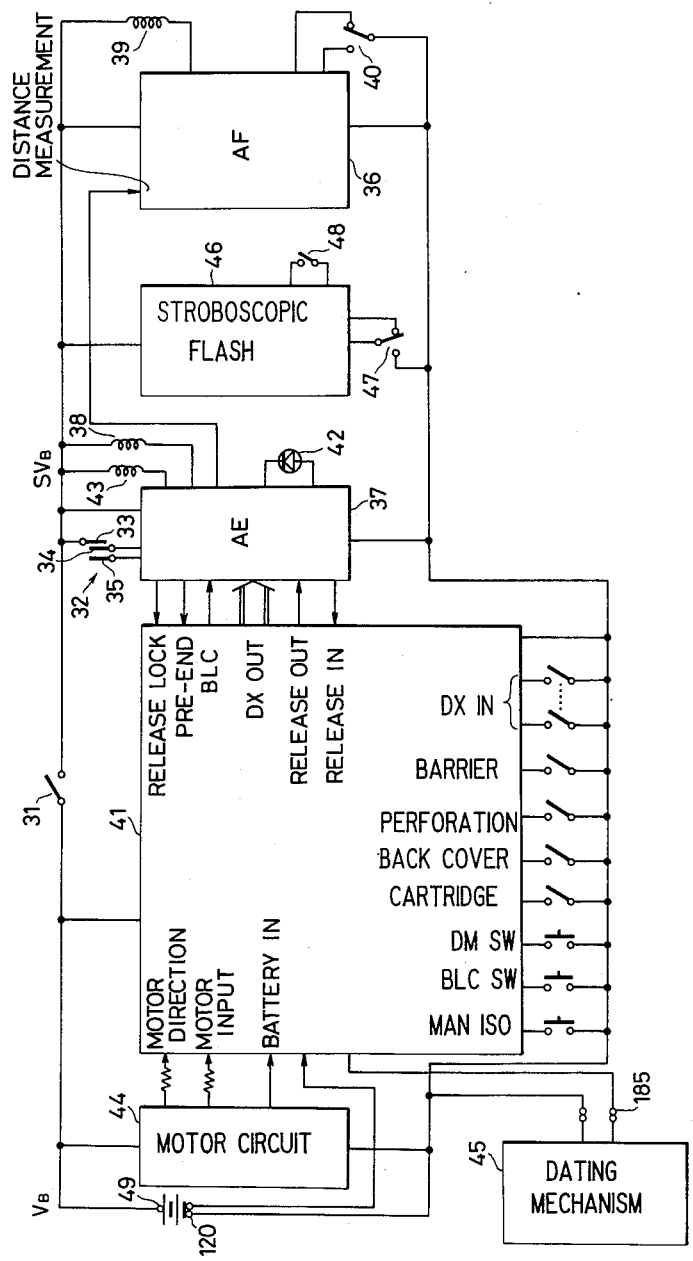
FIG. 2 is a block diagram of an electronic camera circuit in which the camera status display device of the invention is incorporated.

FIG. 2 shows an electronic camera circuit in which a camera status display device according to the present invention is incorporated.

The lens protective cover of a camera can be opened and closed by a driver when a barrier switch is turned on and off, respectively, and a main switch 31 is turned on and off in response to movement of the lens protective cover. When the barrier switch is closed, the lens protective cover is opened and the main switch 31 is turned on. When a shutter release button is depressed to a first stroke to turn on a first switch which is composed of contacts 33, 34 of a shutter release switch 32, a signal for starting distance measurement is applied to an automatic focusing unit 36 of a known construction. The automatic focusing unit 36 then automatically measures the distance from the camera to the object and electrically holds the measured distance. Then, when the shutter release button is depressed more deeply to a second stroke to turn on a second switch which is composed of contacts 33, 35 of the shutter release switch 32, the photographing sequence of the camera is initiated to enable an automatic exposure control unit 37 to energize a shutter release electromagnetic coil 38 and an automatic focusing electromagnetic coil 39 for moving the lens from a close-distance position to an infinite-distance position. A lens position detecting switch 40 is operated each time the lens is moved a prescribed distance. The automatic focusing unit 36 counts signals from the lens position detecting switch 40 to detect the position of the lens. When the position of the lens thus detected corresponds to the measured distance, the automatic focusing unit 36 de-energizes the automatic focusing electromagnetic coil 39 to fix the lens.

As the photographing sequence progresses, the shutter blades are opened. At this time, film sensitivity information of a DX film or manually set film sensitivity information has been given from a liquid crystal display 41 to the automatic exposure control unit 37. The shutter release electromagnetic coil 43 is de-energized by the automatic exposure control unit 37 to close the shutter blades at a timing dependent on the film sensitivity information and the amount of light received from the object and measured by a photodetector 42. When the shutter is completely closed, the winding switch in a motor circuit 44 is turned on to rotate the motor in a normal direction to wind the film. At the same time, the shutter mechanism is charged, thereby finishing the photographing sequence.

When all film frames have been exposed and the film end is reached, a rewinding switch is turned on or set to a rewinding mode by a mechanical film end detector to rotate the motor in the opposite direction for rewinding the film. Upon the film being fully wound back into the cartridge, a film detecting switch is turned off to de-energize the motor. When the camera back cover is manually opened for film removal, the rewinding switch is set to a winding mode in preparation for a new film.

The liquid crystal display 41 serves to display camera statuses, and the dating mechanism 45 records dates on the film frames at the time they are exposed. The stroboscopic flash 46 is energized by closing an X contact 48 at the time a stroboscopic flash power supply switch 47. The battery 49 is set as a power supply into the camera.

Figure 3:
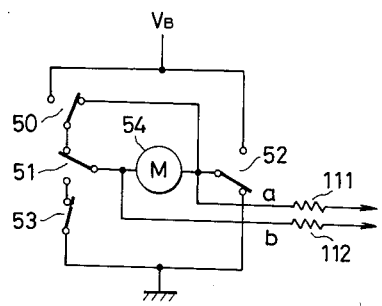
FIG. 3 is a circuit diagram of a motor circuit in the electronic camera circuit shown in FIG. 2.

As shown in FIG. 3, the motor circuit 44 comprises a winding switch 50, two ganged rewinding switches 41, 42, a film detecting switch 53, and a motor 54. The film detecting switch 53 is turned on when the film is pulled from its cartridge. The motor 54 is rotated in a normal direction to wind the film and charge the shutter mechanism when the rewinding switches 51, 52 are set to the winding mode and the winding switch 50 is turned on. When the rewinding switches 51, 52 are set to the rewinding mode at the time the film detecting switch 53 is turned on, the motor 54 is rotated in the opposite direction for rewinding the film. From the opposite terminals of the motor 54, there are generated a motor input signal b indicative of whether there is an input to the motor 54 and a motor direction signal a indicative of the direction of rotation of the motor 54, these signals being applied to the liquid crystal display 41. The condition of the motor 54, the motor input signal, and the motor direction signal are related in the following table 1:

TABLE 1

| Motor direction signal | Motor input signal | Motor condition |
| --- | --- | --- |
| High | High | Stopped in reverse rotation mode |
| Low | High | Rotated in normal rotation mode |
| High | Low | Rotated in reverse rotation mode |
| Low | Low | Stopped in normal rotation mode |

Figure 4:
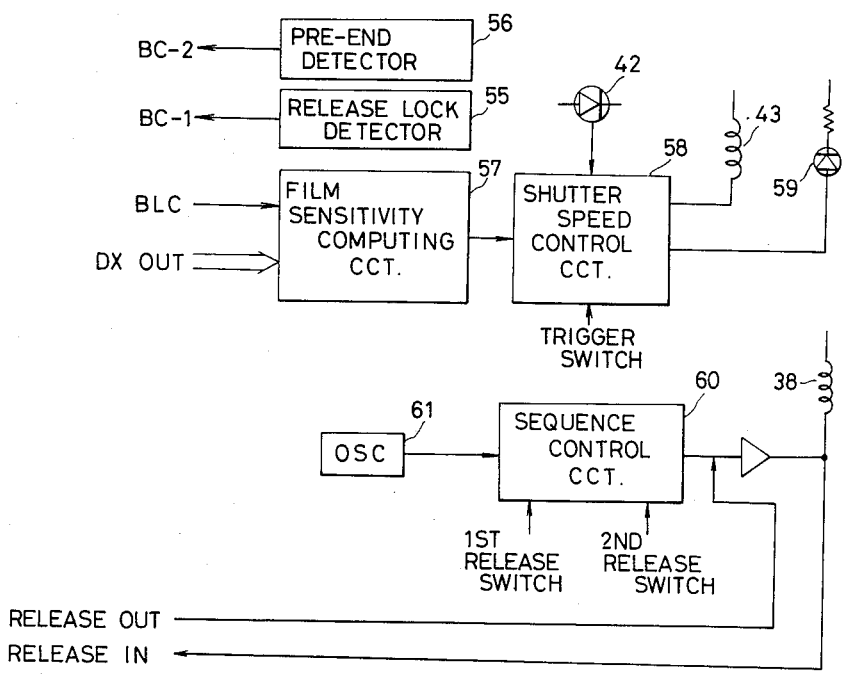
FIG. 4 is a block diagram of an automatic exposure control unit in the electronic camera circuit of FIG. 2.

Automatic film loading and film rewinding while the film is being wound are prohibited by an external circuit As shown in FIG. 4, the automatic exposure control unit 37 has a release lock detector 55 for detecting a reduction in the voltage of the battery 49 below a certain level such as 2.2V at which the camera will malfunction, or detecting the termination of the service life of the battery 49. In response to such detection, the release lock detector 55 applies a release lock signal BC-1 to a shutter release lock means to lock the shutter against being released. The automatic exposure control unit 37 also includes a pre-end detector 56 for detecting a reduction in the voltage of the battery 49 below another level such as 2.3V which is about 5 to 10% below the normal voltage and which indicates that the service life of the battery 49 is about to be terminated, and for applying a pre-end signal BC-1 to the liquid crystal display 41. A film sensitivity computing circuit 57 computes a film sensitivity based on a DX film sensitivity signal or manually set film sensitivity signal DX out and an exposure correcting signal BLC which are fed from the liquid crystal display 41. A shutter speed control circuit 58 determines a shutter speed from the film sensitivity computed by the film sensitivity computing circuit 57 and the brightness of the object as measured by the photodetector 42, and turns on a trigger switch to energize the shutter release electromagnetic coil 43 and then de-energize the same upon elapse of a time period corresponding to the determined shutter speed. The shutter speed control circuit 58 also determines whether or not an image-blur alarm should be given from the shutter speed, and energizes an indicator 59 in the viewfinder to give the image-blur alarm. A sequence control circuit 60 effects sequence control based on clock pulses supplied from an oscillator 61, and turned on the shutter release electromagnetic coil 38 in response to the turn-on of the second switch of the shutter release switch 32. When the film is automatically loaded, the shutter release electromagnetic coil 38 is energized four times by four shutter release pulses from the liquid crystal display 41 for winding the film four times. When the shutter release electromagnetic oil 38 is energized, a shutter release pulse is issued to the liquid crystal display 41.

Figure 5:
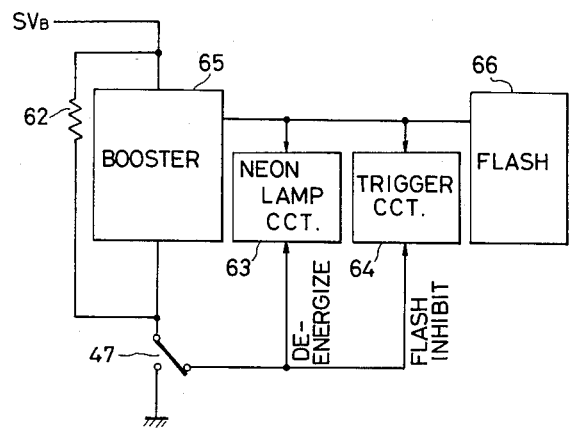
FIG. 5 is a block diagram of a stroboscopic flash in the electronic camera circuit of FIG. 2.

FIG. 5 illustrates the stroboscopic flash 46. When the stroboscopic flash power supply switch 47 is turned off, a power supply voltage SVB is applied through a pullup resistor 62 and the switch 47 as a de-energization signal to a neon lamp circuit 63 and as a flash inhibit signal to a trigger circuit 64, thus de-energizing the neon lamp circuit 63 and the trigger circuit 64. When the stroboscopic flash power supply switch 47 is turned on, the power supply voltage SVB is increased by a booster 65 and then applied to the neon lamp circuit 63, the trigger circuit 64, and a flash 66. The neon lamp circuit 63 detects and indicates that the output voltage from the booster 63 has reached a prescribed voltage. The trigger circuit 64 triggers the flash 66 in response to the turn-on of the X contact 48.

Figure 1:
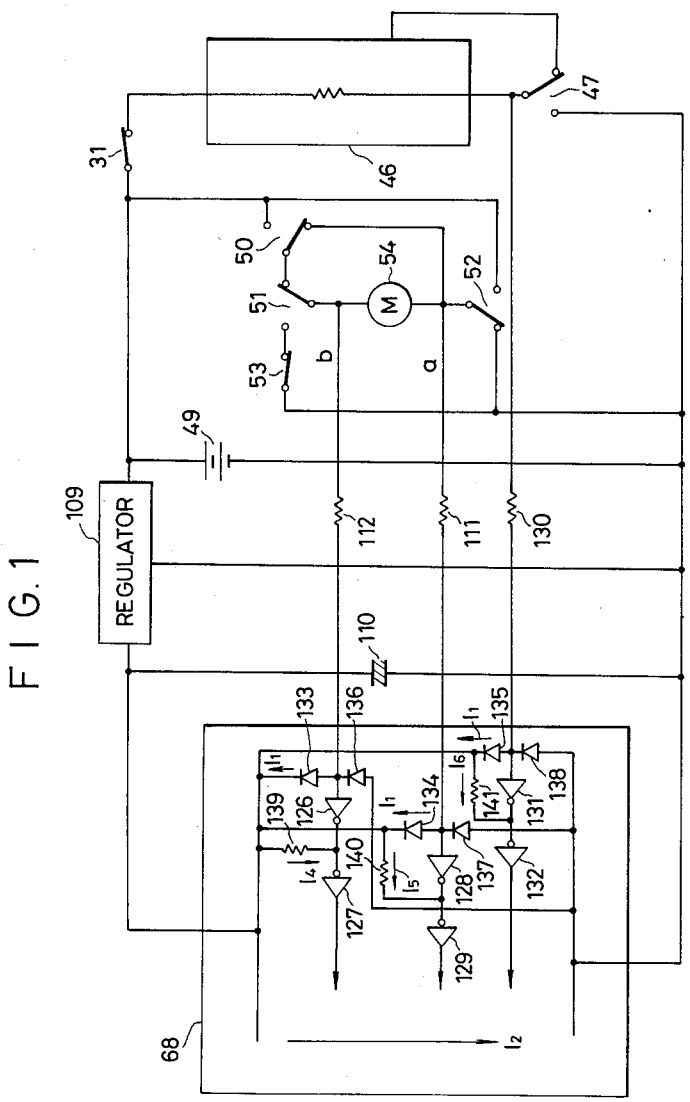
FIG. 1 is a block diagram of a camera status display device according to a first embodiment of the present invention.
Figure 8:
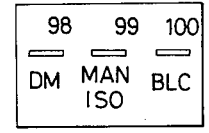
FIG. 8 is a front elevational view of control switches in the electronic camera circuit.
Figure 6:
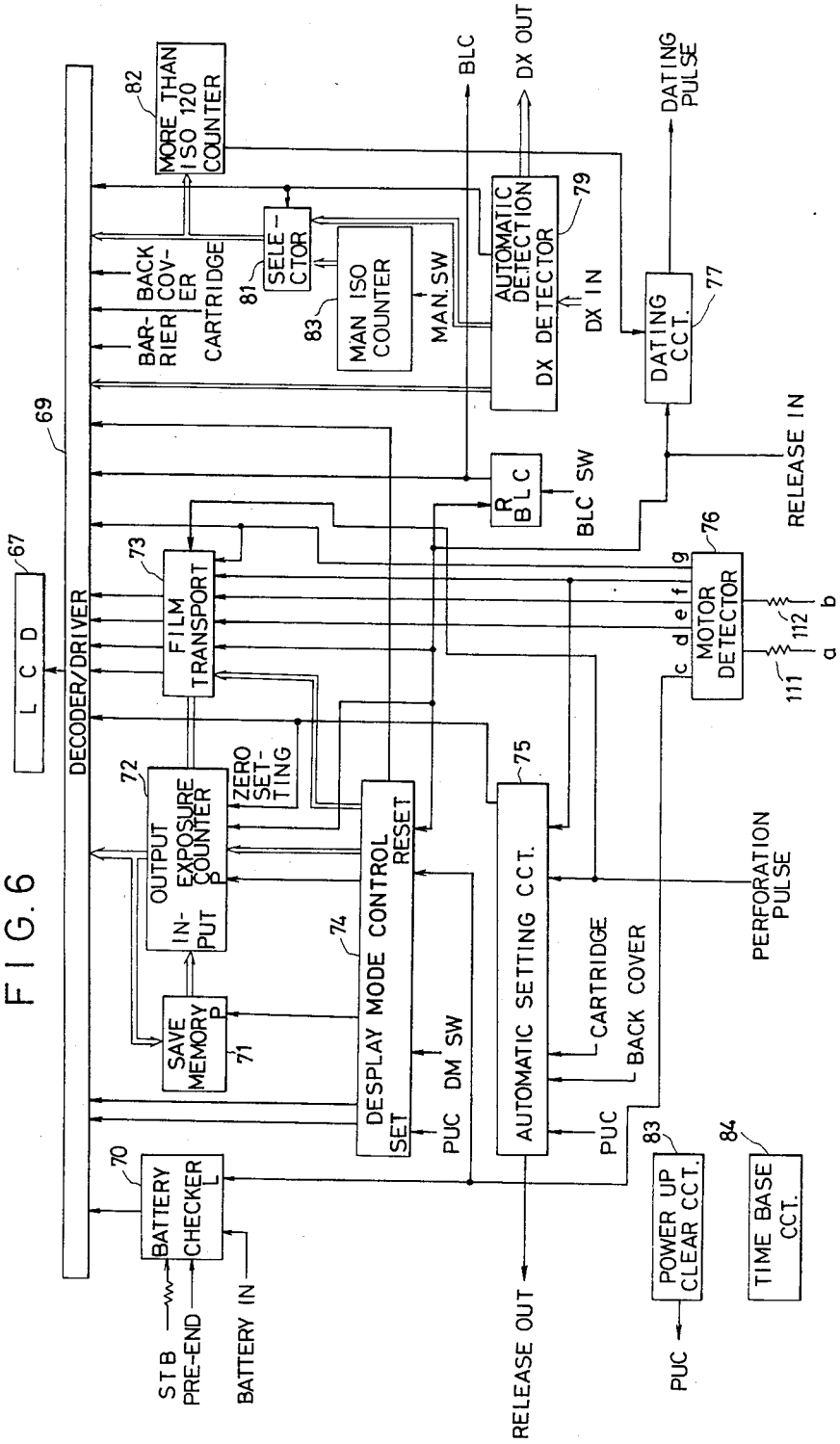
FIG. 6 is a block diagram of a liquid crystal display in the electronic camera circuit of FIG. 2.
Figure 7:
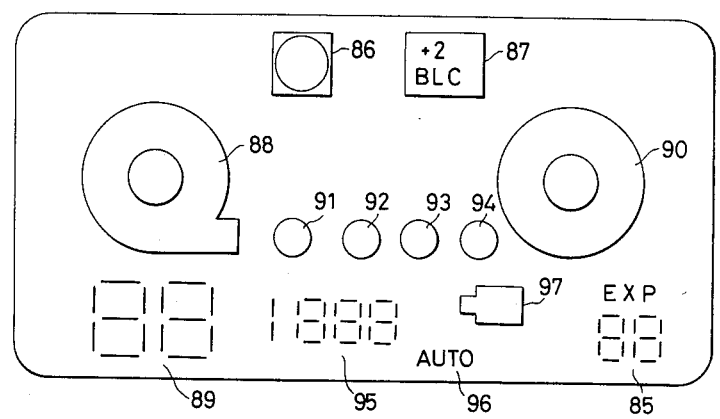
FIG. 7 is a front elevational view of liquid crystal display elements in the liquid crystal display.

As shown in FIG. 6, the liquid crystal display 41 comprises a liquid crystal display unit 67, a CMOS LSI circuit 68, a regulator 109, and a backup capacitor 110 (see FIG. 1). The CMOS LSI circuit 68 has a decoder/driver 69, a battery checker 60, a save memory 71, an exposure counter 72, a film transport unit 73, a display mode control unit 74, an automatic setting circuit 75, a motor detector 76, a dating circuit 77, an exposure correcting unit, a DX detector 79, a film sensitivity counter 80, a selector 81, a more than ISO 200 detector 82, a power up clear circuit 83, and a time base circuit 84. The liquid crystal display unit 67 is fixedly mounted on the upper portion of the camera and has display elements 85 through 97 as shown in FIG. 7 for displaying various camera statuses. As shown in FIG. 8, the camera has a display mode control switch 98, a manual film sensitivity setting switch 99, and an exposure correcting control switch 100. The exposure counter 72, the film sensitivity counter 80, and the main circuit are cleared by the power up clear circuit 83 when the battery 49 is short of power, and are forcibly cleared when the camera back cover is open and the switches 99, 100 are turned off. The time base circuit 84 issues a time base signal to various parts of the CMOS LSI circuit 68.

Figure 9:
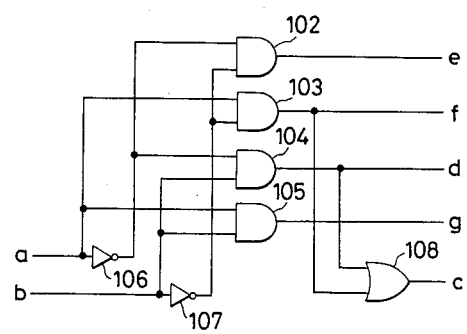
FIG. 9 is a block diagram of a motor detector in the liquid crystal display.
Figure 12:
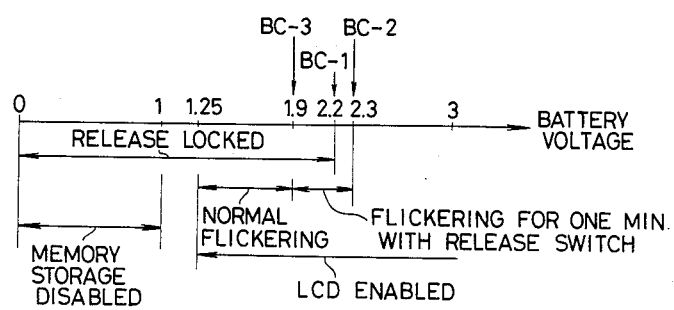
FIG. 12 is a diagram explanatory of operation of the electronic camera circuit.

As shown in FIG. 9, the motor detector 76 has AND gates 102 through 105 and inverters 106, 107 which are reponsive to the motor direction signal a and the motor input signal b supplied through resistors 111, 112 (FIG. 1) from the terminals of the motor 54 for determining one of the motor conditions set forth in the above table 1, and also has an OR gate 108 for determining the rotation of the motor 54 in the normal or reverse rotation mode.

Figure 11:
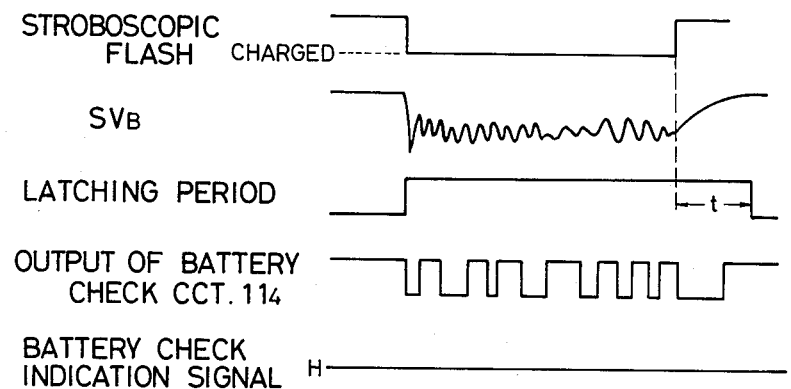
FIG. 11 is a timing chart of operation of the battery checker.
Figure 10:
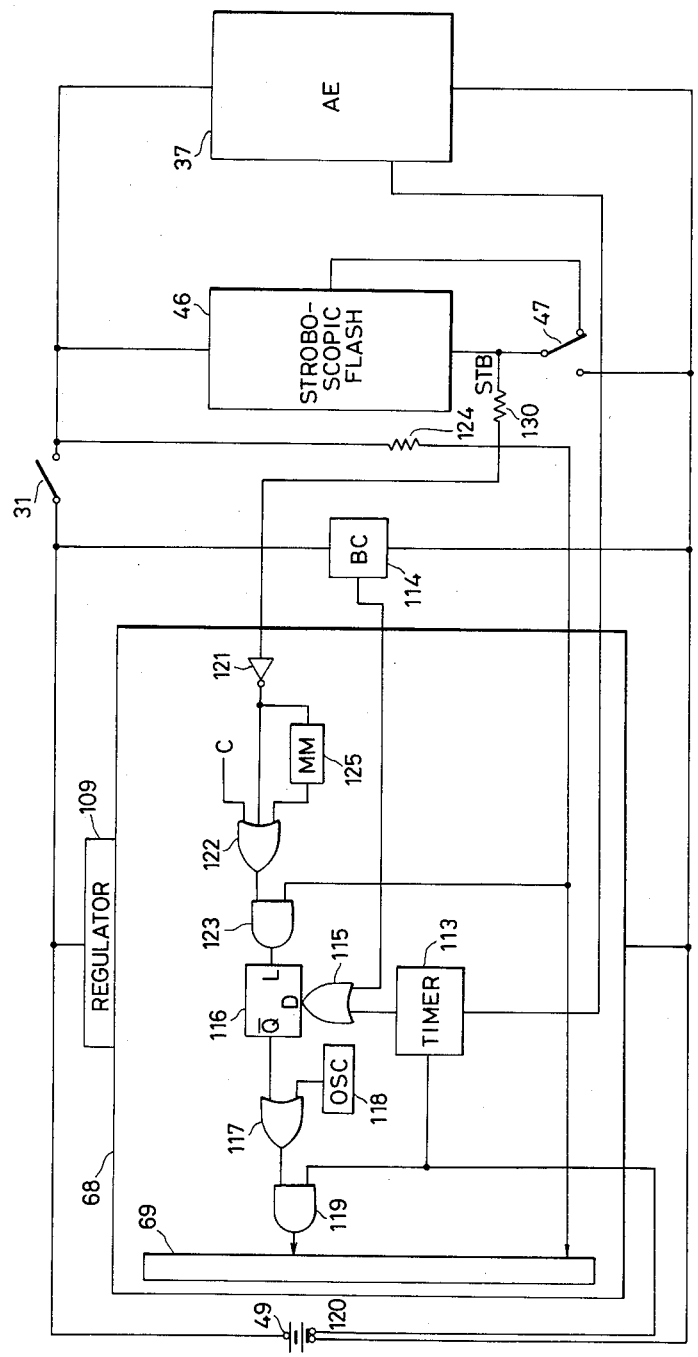
FIG. 10 is a block diagram of a battery checker in the liquid crystal display.

As shown in FIG. 10, the pre-end signal BC-2 from the pre-end detector 56 in the automatic exposure control circuit 37 is applied, only when the shutter release button is depressed, for energizing a timer 113 for one minute. The output signal from the timer 113 and an output signal BC-3 from a battery checker circuit 114 comprising an independent integrated circuit are combined by an OR gate 114 and latched by a latch circuit 116. The inverted output signal from the latch circuit 116 is combined by an OR gate 117 with flickering pulses supplied from an oscillator 118 at a constant period. The output signal from the OR gate 117 and a signal from a battery detecting switch 120 are ANDed by an AND gate 119. The decoder/driver 69 is reponsive to the output signal from the AND gate 119 for energizing the battery-shaped display element 97 on the liquid crystal display unit 67. The battery detecting switch 120 detects whether the battery 49 is set in the camera or not. If no battery is set in the camera, then no output signal is issued from the AND gate 119 and the display element 97 is de-energized. The battery checker circuit 114 detects whether the voltage of the battery 49 is lower than a preset voltage, such as 1.9V, which is higher than a minimum voltage of 1V required for holding information in memory elements in the LSI circuit 68. A regulator 109 converts the voltage of 3V of the battery 49 into a constant voltage of 1.5V under the control of a unidirectional current and applies the converted constant voltage to the LSI 68 and a capacitor 110 (FIG. 1). Therefore, if the voltage of the battery 49 is higher than 2.3V, then the inverted output signal from the latch circuit 116 goes high to energize the display element 97 continuously. If the voltage of the battery 49 ranges from 1.9 to 2.3V and the output signal BC-2 is issued from the pre-end circuit 56 each time the shutter release button is pressed, then the timer 113 is energized for one minute to enable the display element 97 to flicker in response to the output signal from the oscillator 118 for thereby indicating that the battery 49 be replaced. If the voltage of the battery 49 ranges from 1.25 to 1.9V, the output signal BC-3 is issued from the battery checker circuit 114 to enable the display element 97 to flicker at all times for indicating that the battery 49 be replaced. If the voltage of the battery 49 is lowered below 1.25V, then the display element 97 gives no indication. The signal applied from the stroboscopic flash power supply switch 47 via a resistor 130 is inverted by an inverter 121 and applied through an OR gate 122 to an AND gate 123. The output voltage of the main switch 31 is applied through a resistor 124 as a cover signal to the decoder/driver 69 for energizing the display element 86 to indicate the opening of the lens protective cover. The cover signal is also applied to the AND gate 123. Consequently, when the main switch 31 is turned off and the stroboscopic flash 46 is not used, the output signal from the AND gate 123 goes low, and the latch circuit 116 inverts the output signal from the OR gate 115 and issues the inverted signal to the OR gate 117. As shown in FIG. 11, when the stroboscopic flash 46 is charged, the power supply voltage varies to allow the battery checker circuit 114 to tend to malfunction (or detect temporary consumption of the battery 49). At this time, however, the stroboscopic flash power supply switch 47 is turned on and the output signal from the AND gate 123 is high, so that the latch circuit 116 holds the output signal from the OR gate 115 to prevent the display element 97 from giving an erroneous indication arising from the malfunction of the battery checker circuit 114. When the stroboscopic flash power supply switch 47 is turned off upon completion of the energization of the stroboscopic flash 46, a monostable multivibrator 125 is triggered by a negative-going edge of the output signal from the inverter 121 to apply an output signal to the ORE gate 122 for a time interval such as 1 to 60 seconds required to restore the power supply voltage. Accordingly, the output signal from the AND gate 125 goes low after the power supply voltage is restored, to unlatch the latch circuit 116. When the main switch 31 is turned off, the signal from the stroboscopic flash power supply switch 47 goes low and the output signal from the OR gate 122 goes high. The cover signal from the main switch 31 goes low and the output signal from the AND gate 123 remains low, so that the latch 116 remains unlatched. Where the automatic focusing unit 36 has a capacitor of a large capacitance connected to the battery 49 through the main switch 31, the cover signal may be generated by a switch ganged with the main switch 31. If the battery 49 is not loaded in the camera, the timer 113 is reset by a signal from the battery detecting switch 120. The power supply voltage is lowered when the motor 54 is in rotation. However, the OR gate 108 in the motor detector 76 applies a motor rotation signal C to the OR gate 122 to enable the latch circuit 116 to hold the output signal from the OR gate 115, thus preventing the display element 97 from giving a erroneous indication.

As shown in FIG. 1, the motor direction signal a and the motor input signal b are applied from the terminals of the motor 54 via the resistors 111, 112 and inverters 126-129 to the motor detector 76. The signal applied from the stroboscopic flash power supply switch 47 through a resistor 130 is delivered via inverters 131, 132 to the battery checker 70. There are protective diodes 133 through 138 connected between input terminals LSI circuit 68 (that is, the input sides of the inverters 126, 128, 131), and the power supply terminal (output side of the regulator 109) and the common terminal. Resistors 139 through 141 are connected between the power supply terminal and the output terminals of the inverters 126, 128, 131. Therefore, the regulator 109 allows a current to flow therethrough only in direction, but cannot absorb a current flowing in the opposite direction. Since the voltage of the battery 49 is 3V and the output voltage from the regulator is 1.5V, if the motor input signal b goes high, the current I1 flows back through the protective diode 133, and the output from the inverter 126 goes low to pass a current I4 through the resistor 139. Assuming the current comsumed by the LSI 68 except the resistors 139 through 141, the resistor 139 is selected such that $I1 < I2 + I4$. Thus, no current flows back from the LSI 68 to the backup capacitor 110, causing no power supply variation for the LSI 68. When the voltage of the battery 49 is eliminated, the LSI 68 is fed by the backup capacitor 110. When the motor direction signal a and the signal from the stroboscopic flash power supply switch 47 goes hight, currents I5, I6 flow through the resistors 140, 141, respectively. The resistors 140, 141 are selected such that $I1 < I2 + I5$, $I1 < I2 + I6$. Therefore, no current flows from the LSI 68 into the backup capacitor 110.

Figure 13:
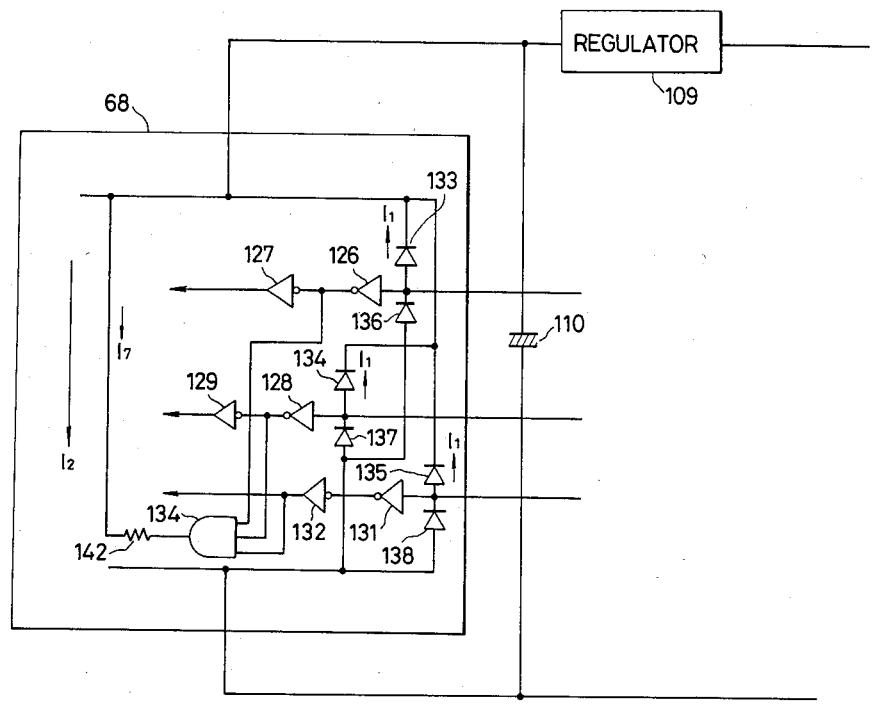
FIG. 13 is a block diagram of a camera status display device according to a second embodiment of the present invention.

As shown in FIG. 13, the resistors 139 through 141 may be replaced with a resistor 142 and an AND gate 143. In this alternative, when at least one of the motor direction signal a, the motor input signal b, and the signal from the stroboscopic flash power supply switch 47 goes high, the output from the AND gate 143 goes low to pass a current I7 through the resistor 142. The resistor 142 is selected such that $3I1 < I2 + I3$. Therefore, no current flows from the LSI 68 into the backup capacitor 110.

Figure 14:
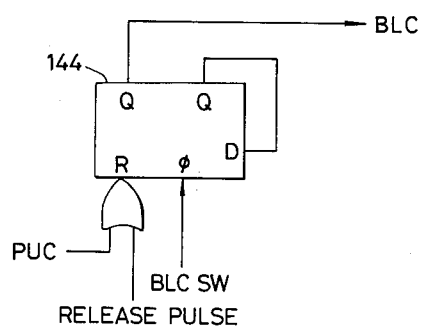
FIG. 14 is a block diagram of an exposure correcting unit in the liquid crystal display of the camera status display device of FIG. 13.

As shown in FIG. 14, the exposure correcting unit 78 is composed of a flip-flop 144 and an OR gate 145. The flip-flop 144 can be reset by a clear signal PUC from the power up clear circuit 83 and a shutter release signal from the automatic exposure control unit 78, and set by a signal from the exposure correcting switch 100 as it is turned on. The output signal from the flip-flop 144 is fed as an exposure correcting signal to the automatic exposure control unit 37 and the decoder/driver 69 for energizing the display element 87 to indicate exposure correction.

Figure 15:
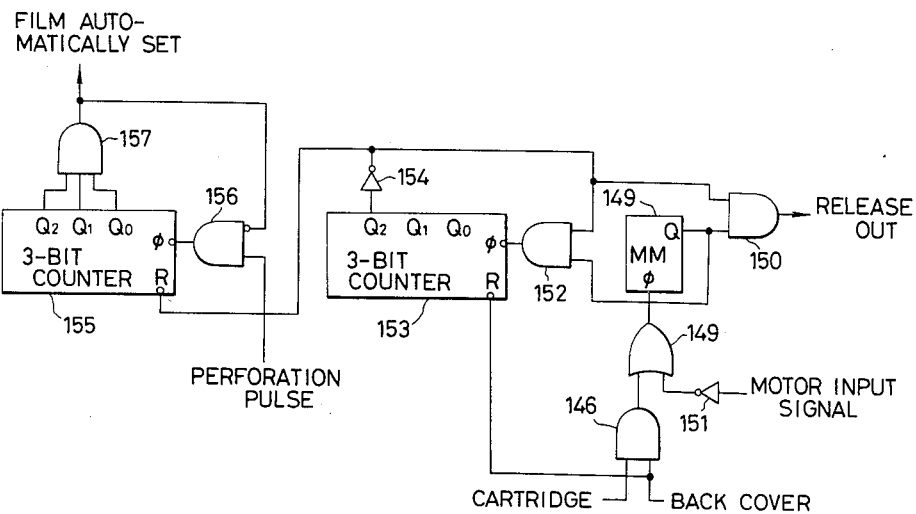
FIG. 15 is a block diagram of an automatic setting unit in the liquid crystal display.
Figure 16:
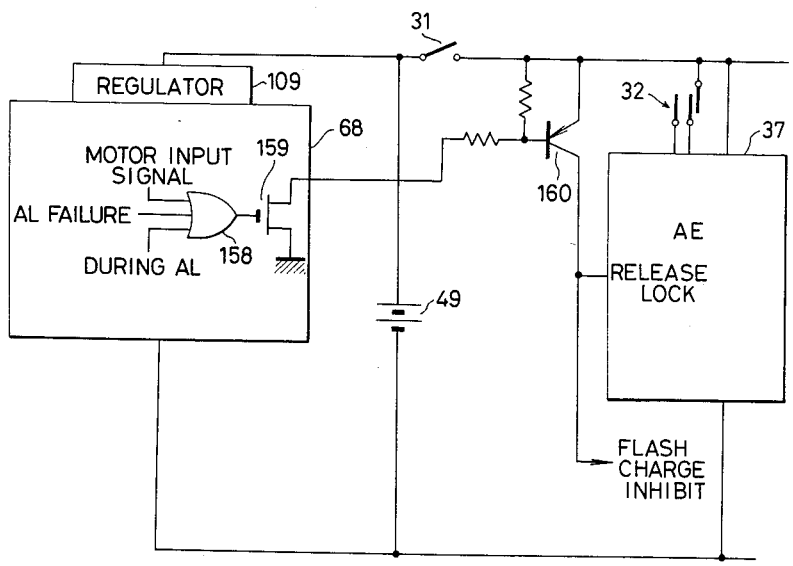
FIG. 16 is a block diagram of a release lock unit in the electronic camera circuit.

As illustrated in FIG. 15, a back cover signal from a back cover detecting switch is applied to an AND gate 146, and a cartridge signal from a cartridge detecting signal, which is inverted by an inverter, is also applied to the AND gate 146. When a film cartridge is loaded into the camera and the back cover is closed, the AND gate 146 triggers a monostable multivibrator 147 which produces a pulse. The pulse from the monostable multivibrator 147 goes through an OR gate 148 to trigger a monostable multivibrator 149 which generates a release pulse delivered through an AND gate 150 to the automatic exposure control unit 37. The shutter mechanism is now idly operated and the motor 54 is rotated in the normal direction to wind the film. The motor input signal from the motor circuit 44 is inverted by an inverter 151 and fed through the OR gate 148 to trigger the monostable multivibrator 149 with a positive-going edge of the inverted motor input signal (i.e., a negative-going edge of the motor input signal), thus supplying a release pulse through the AND gate 150 to the automatic exposure control unit 37. Therefore, the idle operation of the shutter mechanism and the film winding are cyclically effected, and the release pulses from the monostable multivibrator 149 are fed through an AND gate 152 and counted by a counter 153. The counter 153 is supplied with the back cover signal throught its reset terminal. When the resetting of the counter 153 is cancelled by the closing of the back cover and the counter 153 counts four release pulses, the output thereof to an inverter 154 goes high to render the output of the inverter 154 low for thereby disabling the AND gates 150, 152. Therefore, the idle operation of the shutter mechanism is completed in four cycles. The resetting of a 3-bit counter 155 is cancelled when the output of the inverter 154 goes low, and the counter 155 counts perforation pulses applied as the film is wound after the idle operation of the shutter mechanism has been effected four cycles. The perforation pulse is generated, each time the film travels a perforation interval, by a perforation detecting switch driven by a free sprocket which is rotated as the film runs. The perforation pulses are applied through an AND gate 156 to the counter 155. When the counter 155 counts seven perforation pulses, it issues an output to enable an AND gate 157 which issues an output signal indicative of automatic setting of the film. The AND gate 156 is then disabled. The output signal from the AND gate 157 is applied to the decoder/driver 69 to energize the spool-shaped display element 90. Thus, when the film is placed in the camera and the back cover is closed, the film is automatically loaded and, if successful, the display element 90 is energized. When the motor input signal changes from the high level to the low level before six perforation pulses are generated (the AND gate 157 is disabled) after the four idle cycles of the shutter mechanism, and when the time from the positive-going edge of the release pulse from the AND gate 150 to the positive-going edge of the motor input signal is longer than a prescribed time period, an automatic film loading failure detector (not shown) detects an automatic film loading failure and issues a flickering signal to the decoder/driver 69 to enable the display element 90 to flicker, indicating the automatic film loading failure. As shown in FIG. 16, an OR gate 158 is supplied with an automatic film loading failure signal from the automatic film loading failure detector upon an automatic film loading failure, the motor input signal from the motor circuit 44, and an automatic film loading signal from an automatic film loading detector (not shown) when the film is being automatically loaded. A field-effect transistor 159 is energized by the output signal from the OR gate 158 to energize a transistor 160. The output from the collector of the transistor 160 is applied as a release lock signal to the automatic exposure control unit 37 for a release lock when the automatic film loading fails, the motor input signal is applied, and the film is being automatically loaded. The collector output from the transistor 160 is also applied as a charging inhibit signal to the stroboscopic flash 46.

The decoder/driver 69 is responsive to the signals from the cartridge detecting switch and the back cover detecting switch for energizing the display element 88 to indicate the presence of the film when the film is loaded and the back cover is closed. When the back cover is opened, the display elements 85, 88–94, 96 are deenergized.

Figure 17:
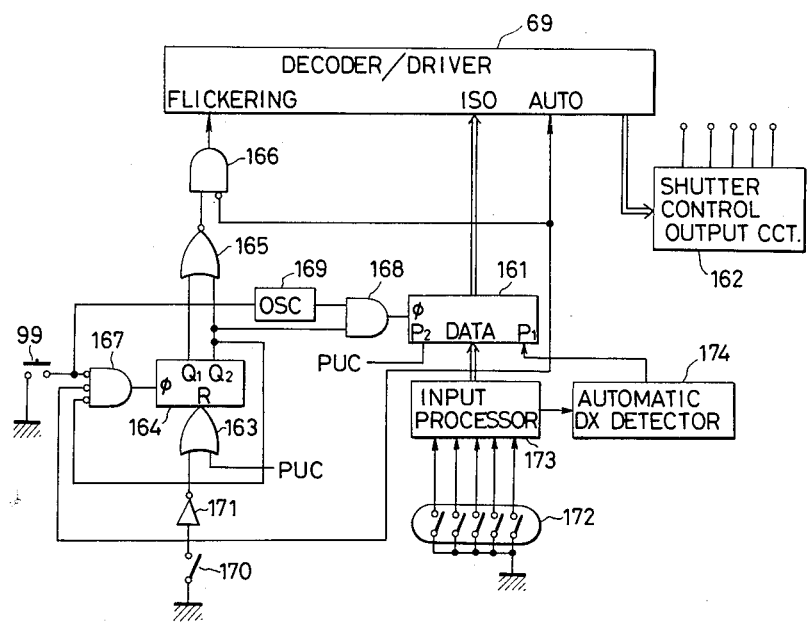
FIGS. 17 through 19 are block diagrams of portions of the liquid crystal display.

In the DX detector 79, the ISO counter 80, and the selector 81, the manual film sensitivity setting switch 99 is capable of confirming and changing an ISO film sensitivity, as shown in FIG. 17. With one preferred manual ISO sensitivity setting system, the ISO sensitivity 100 (which is most frequently be used) is set again each time the back cover of the camera is opened, and it is necessary to depress the switch 99 each time the film is loaded when two films of ISO sensitivity 1000, for example, are to be used successively. To avoid this, the previously used ISO sensitivity should be memorized, and should be used next time. For checking if a film of the same sensitivity is to be used, the indication of the ISO sensitivity is flickered to draw the user's attention when the back cover is opened. If the indicated ISO sensitivity is acceptable, the manual switch is depressed for confirmation to thereby change the ISO sensitivity indication from the flickering energization to the continuous energization. Thereafter, the ISO sensitivity settings can be varied by depressing the manual switch. The most frequently used ISO sensitivity 100 should forcibly be set as when the battery is replaced. The arrangement of the invention shown in FIG. 17 is based on the above idea.

(1) When the battery 49 is set in the camera, the power up clear circuit 83 generates the clear pulse PUC by which a value corresponding to the ISO sensitivity 100 is preset in a counter 161. The output from the counter 161 is fed to the decoder/driver 69 to enable the display element 95 to indicate the ISO sensitivity 100, and an output corresponding to the ISO sensitivity 100 is fed through a shutter control output circuit 162 to the automatic exposure control unit 37.

(2) At this time, the pulse PUC from the power up clear circuit 83 is fed through an OR gate 163 to reset a counter 164. The output from a NOR gate 165 goes high to make the output of an AND gate 166 high. The output from the AND gate 166 is applied to a flickering control terminal of the decoder/driver 69 to enable the indication "100" on the display element 95 to flicker.

(3) When the manual switch 99 is depressed once to set the ISO sensitivity to 400, a pulse is generated thereby, fed through an AND gate 167, and counted by the counter 164. The first-figure output from the counter 164 goes high to make the output of the NOR gate 165 low, whereupon the output from the AND gate 166 goes low to change the indication "100" on the display element 95 from the flickering energization to the continuous energization. The second-figure output from the counter 164 remains low at this time to disable the AND gate 168, and hence no pulse is applied to the counter 161.

(4) When the manual switch 99 is pressed once again, a pulse generated thereby is delivered through the AND gate 167 and counted by the counter 164. The secondfigure output of the counter 164 goes high, and an oscillator 169 is energized by the depression of the manual switch 99 to generate a pulse. This pulse is fed through an AND gate 168 and counted by the counter 161, whereupon the indication on the display element 95 becomes "200", and an output corresponding to the ISO sensitivity 200 is issued from the shutter control output circuit 162.

(5) When the manual switch 99 is pressed once more, the counters 164, 161 count pulses in the same manner as in (4) above, and the indication on the display element 95 becomes "400", and an output corresponding to the ISO sensitivity 400 is issued from the shutter control output circuit 162. By continuously depressing the manual switch 99, the oscillator 169 generates a succession of pulses to enable the counter 161 to count up the pulses for successively changing ISO sensitivity settings.

(6) When the back cover is opened for film removal upon completion of the photographing operation, the back cover detecting switch 170 is turned off to render the output of an inverter 171 high to reset the counter 164. The output of the AND gate 166 goes high in the same manner as in (2) above to flicker the indication "400" on the display element 95.

(7) When a new film of ISO sensitivity 400 is set in the camera and the back cover is closed, the switch 170 is turned on and the resetting of the counter 164 is cancelled to keep the indication "400" flickering on the display element 95. By depressing the manual switch 99 once at this time, the indication "400" on the display element 95 changes from the flickering energization to the continuous energization in the same manner as in (3) above. Even if this operation of the manual switch 99 to confirm the film sensitivity is omitted due to an oversight, no problem will arise since the output from the counter 161 is applied through the decoder section of the decoder/driver 69 to the shutter control output circuit 162.

(8) If a film which is not a DX film is set in the camera, then the film sensitivity is required to be manually set. If a DX film is set in the camera, on the other hand, information on the film catridge is read by an input unit 172 and processed by an input processor 173. An automatic DX detector 174 then detects the setting of the DX film in the camera based on the output signal from the input processor 173. In response to the output signal from the automatic DX detector 174, information on the film sensitivity is preset in the counter 161, and the AND gates 166, 167 are disabled. The information on the cartridge contains information about the number of film exposures and information about the film sensitivity. The information on the number of film exposures is indicated on the display element 85 by the decoder/driver 69, and the information on the film sensitivity is preset in the counter 161 and indicated on the display element 95 and also fed from the shutter control output circuit 162 to the automatic exposure control unit 37. The decoder/driver 69 is responsive to the output signal from the automatic DX detector 174 for energizing the display element 96 to indicate that the DX film has been loaded.

Figure 18:
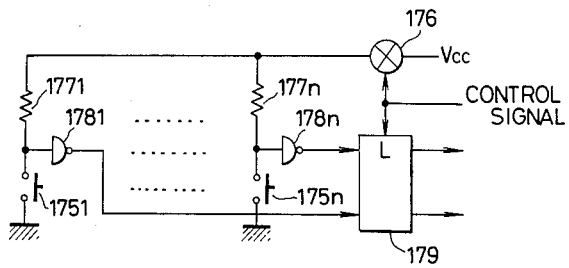

As shown in FIG. 18, the input unit 172 is composed of switches 175l through 175n, resistors 177l through 177n, inverters 178l through 178n, and a latch circuit 179. The switches 175l through 175n are turned on/off by conductive patterns on the cartridges to read information represented by the conductive patterns. The information is read when a switch 176 is turned on by a one-sec interval control signal to supply a power supply voltage Vcc, and the read information is inverted by the inverters 178l through 178n and latched in the latch circuit 179 by the above control signal. The resistors 177l through 177n may be replaced with a constant-current circuit.

Figure 19:
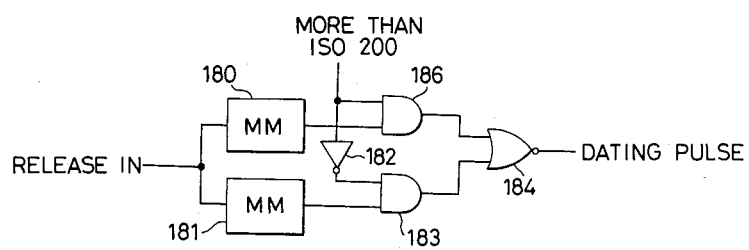
Figure 22:
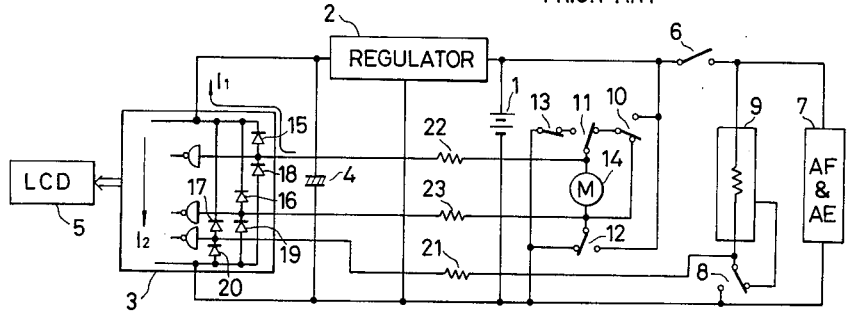
FIG. 22 is a block diagram of a conventional electronic camera circuit.
Figure 23:
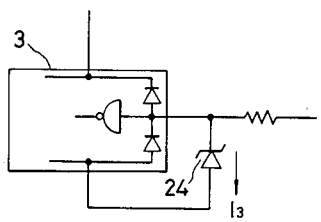
FIGS. 23 and 24 are block diagrams of improved arrangements for the electronic camera circuit illustrated in FIG. 22.
Figure 24:
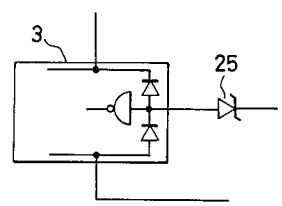

As shown in FIG. 19, the dating circuit 77 has monostable multivibrators 180, 181 which are triggered by a release pulse from the automatic exposure control unit 37 for producing pulses of 30 mS and 60 mS, respectively. If the film sensitivity is lower than 200, then the pulse of 60 mS from the monostable multivibrator 181 is fed through an AND gate 183 enabled by the output from an inverter 182 and also through an AND gate 183, a NOR gate 184, and a connector 185 (FIG. 2) to the dating mechanism 45. When the film sensitivity of 200 or more is detected by the more than ISO 200 detector 82 based on the content of the counter 161, the detecting signal is applied to an AND gate 186 to allow the pulse of 30 mS from the monostable multivibrator 180 to pass through the AND gate 186, the NOR gate 184, and the connector 185 to the dating mechanism 45. The dating mechanism 45 is mounted on the back cover, and the connector 185 is connected to the dating mechanism 45 when the back cover is closed. As shown in FIG. 20, the dating mechanism 45 comprises a dating module 187, a lamp 188, transistors 189, 190, resistors 191, 192, and a battery 193. A pulse from the connector 185 is applied to a recording trigger input terminal X of the dating module 187 and simultaneously energizes the transistor 189. At this time, the transistor 194 in the dating module 187 is turned on by the pulse of 60 mS to energize the transistor 190 for energizing the lamp 188, thus recording the data on the film. No date is recorded if the dating module 187 is turned off to keep the transistor 194 de-energized.

Figure 21:
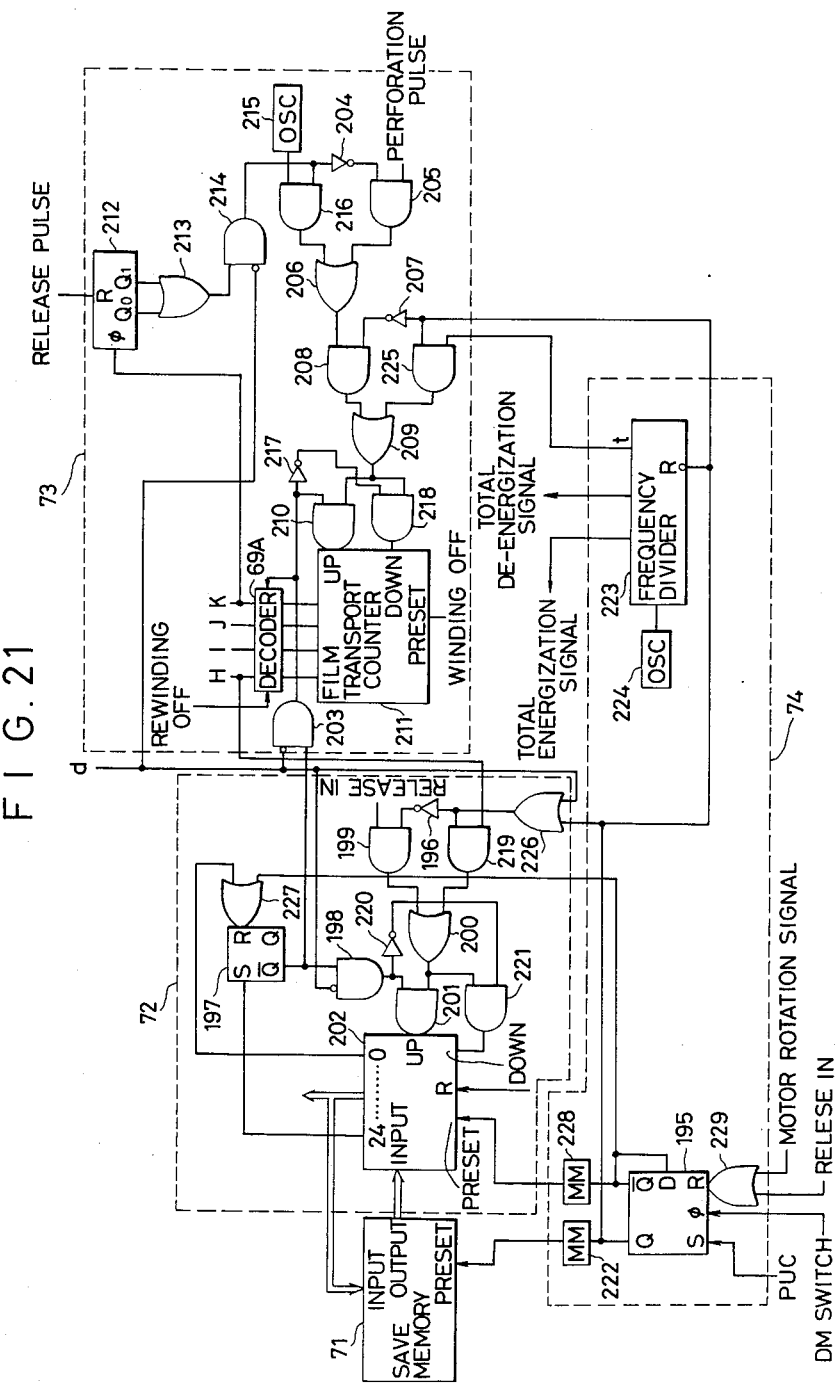
FIG. 21 is a block diagram of a portion of the liquid crystal display.

The save memory 71, the exposure counter 72, the film transport unit 73, and the display mode control unit 74 are shown in FIG. 21. In the normal photographing mode, a flip-flop 195 is reset to produce a low noninverted output to make the output of an inverter 196 high. A flip-flop 197 is reset to make its noninveted output high, and the rewinding signal d from the motor detector 76 is low to render the outputs of AND gates 198, 203 high. Therefore, when a release pulse is applied from the automatic exposure control unit 37, it is applied through an AND gate 199, an OR gate 200, and an AND gate 201 to the up/input terminal of an exposure counter 202 for enabling the same to count up film exposures. The decoder/driver 69 indicates the count of the exposure counter 202 on the display element 89. When the shutter operation is over and the film is wound, perforation pulses are applied from the perforation switch through an AND gate 205 enabled by the output of an inverter 204 and an OR gate 206, through an AND gate 208 enabled by the output of an inverter 207 and an OR gate 209, and thence through an AND gate 210 enabled by the output of an AND gate 203 to the up/input terminal of a film transport counter 211 for enabling the same to count up the pulses. The decoder 69A in the decoder/driver 69 decodes the output from the film transport counter 211 to successively energize the display elements 91 through 94 for indicating the travel of the film. The signal K for energizing the display element 94 is also applied from the decoder 69A to the count input of a 2-bit counter 212. When the signal K goes high, the first-figure output of the counter 212 goes high to make the output of an OR gate 213 high and the output of an AND gate 214 high, thus rendering the output of the inverter 204 low. Instead of the perforation pulses, remaining-exposure pulses are applied from an oscillator 215 through an AND gate 216, the OR gate 206, the AND gate 208, the OR gate 209, the AND gate 210 to the up/input terminal of the film transport counter 211 which repeatedly counts up the pulses to repeat the successive energization of the display elements 91 through 94. This operation is continued until four output pulses K of the decoder 69A are applied to the counter 212 to render the first- and second-figure outputs thereof low, and is referred to as a remaining-exposure indication of the film transport.

When the camera enters the film rewinding mode after all film frames have been exposed, the rewinding signal d from the motor detector 76 goes high and the outputs from the AND gates 198, 203, 214 go low. The perforation pulses generated as the film is rewound are applied through the AND gate 205, the OR gate 206, the AND gate 208, the OR gate 209, and the AND gate 218 enabled by the output of the inverter 217 to the down/input terminal of the film transport counter 211, which counts down the pulses to successively energize the display elements 94 through 91 in the order named for indicating that the film is being rewound. A signal H which energizes the display element 91 is generated per eight perforations corresponding to one film frame, and is applied from the decoder 69A through an AND gate 219, the OR gate 200, and an AND gate 221 enabled by the output from an inverter 220 to the down/input terminal of the exposure counter 202, which then counts down the signal. At this time, the output of an OR gate 226 is rendered high by the rewinding signal d. When the film detecting switch 53 of the motor detector 44 is turned off at the time the film rewinding is completed, the motor detector 76 applies a rewinding-off signal g to the decoder/driver 69 to enable the display element to indicate "E" irrespectively of the count of the exposure counter 202.

When the display mode switch 98 is depressed to generate a pulse in the normal photographing mode, the flip-flop 195 is reset by this pulse to enter the display mode. A monostable multivibrator 222 is triggered to generate a pulse by the positive-going edge of the non-inverted output of the flip-flop 195. The generated pulse is aplied to the preset terminal of the save memory 71 to store the count of the exposure counter 202 in the save memory 71. Upon the noninverted output of the flip-flop 195 going high, the resetting of a frequency divider 223 is cancelled to enable the same to frequency-divide the output pulses from an oscillator 224 for rendering high the output of a total energization terminal of the frequency divider 223. The signal from the total energization terminal of the frequency divider 223 is applied to the decoder/driver 69 to energize all of the display elements 85 through 97. Then, quasi-perforation pulse are generated at the frequency division terminal t of the frequency divider 223. If the inverted output of the flip-flop 197 is high and the output of the AND gate 203 is high, the quasi-perforation pulses are fed through an AND gate 225, the OR gate 209, and the AND gate 210 to the up/input terminal of the film transport counter 211, which counts up the pulses to successively energize the display elements 91 through 94. The output pulse H of the decoder 69A is supplied via the AND gate 219, the OR gate 200, and the AND gate 201 to the up/input terminal of the exposure counter 202, which counts up the pulse to increments the indication on the display element 89.

The above operation continues until the count of the exposure counter 202 reaches "24". When the count of the exposure counter 202 reaches "24", the flip-flop 197 is set by the output of the exposure counter 202 to make the inverted output thereof low, so that the outputs of the AND gates 198, 203 go low. Therefore, the output pulses from the frequency division terminal t of the frequency divider 223 are fed through the AND gate 225, the OR gate 209, and the AND gate 218 to the down/input terminal of the film transport counter 211 for enabling the display elements 91 through 94 to indicate the film rewinding. The output pulse H from the decoder 69A is also fed via the AND gate 219, the OR gate 200, and the AND gate 221 to the down/input terminal of the exposure counter 202, which counts down the pulse to decrements the indication on the display element 89.

When the above operation is repeated 24 times, the exposure counter 202 reaches "0", and its output is applied through an OR gate 227 to the reset terminal of the flip-flop 197 to reset the same. Then, a total deenergization pulse is applied from the frequency divider to the decoder/driver 69 to de-energize all of the display elements 85 throught 97.

The output of the total energization terminal of the frequency divider 223 is then rendered high. The aforesaid cycle of operation will thereafter be repeated.

When the display mode switch 98 is thereafter depressed to generate a pulse, this pulse resets the flip-flop 195 to cancel the display mode, and a monostable multivibrator 228 is triggered to produce a pulse by the positive-going edge of the inverted output from the flip-flop 195. The pulse generted by the monostable multivibrator 228 is applied to the preset terminal of the exposure counter 202 to preset the content of the save memory 71 in the exposure counter 202, and the count of the exposure counter 202 returns to the value immediately prior to the display mode. The noninverted output of the flip-flop 195 goes low to reset the frequency divider 223 to enter the normal photographing mode.

In the display mode, the energization of all display elements 85 through 97 continues for 1.5 sec., the indication of the film transport continues for 34.5 sec., the time taken after the film transport indication has been finished and before the film rewinding indication is started is 1.5 sec., the film rewinding indication continues for 34.5 sec., and the de-energization of all display elements continues for 1.5 sec.

The display mode is initiated when the flip-flop 195 is set by the output signal from the power up clear circuit 83. When the release pulse from the automatic exposure control unit 37 or the motor rotation signal C from the motor detector 76 is applied through an OR gate 229 to the reset terminal of the flip-flop 195, the flip-flop 195 is reset to cancel the display mode.

Although certain preferred embodiments have been shown and described, it should be understood that many changes and modifications may be made therein without departing from the scope of the appended claims.

What is claimed is:

1. A camera status display device comprising:
   a motor for winding the film in the camera;
   a perforation sensor for sensing perforations in the film and producing perforation pulses in response to the movement of the film;
   a first counter for counting said perforation pulses;
   a decoder connected to said first counter for sequentially actuating a plurality of outputs in response to the count in said first counter;
   display means with a plurality of indicators, with each indicator being connected to a corresponding one of said plurality of outputs from said decoder;
   each of said plural indicators being actuated sequentially in response to the winding of the film to produce an indication of a remaining exposure and an indication of moving film;
   an oscillator for producing oscillator pulses;
   logic means having inputs connected to said oscillator and to said perforation sensor for receiving input pulses therefrom and an output connected to said first counter;
   a second counter connected to said decoder and being incremented once each time a given one of the indicators is actuated;
   said logic means being controlled by said second counter to pass pulses only from said perforation sensor when the count in the second counter is a first value and to pass pulses only from said oscillator when the count in the second counter is a second value and to pass neither pulses when the count in the second counter is a third value.

2. A camera status display device according to claim 1, wherein said first counter is reversible, said logic means has an up output and a down output, both connected to said first counter; and
   wherein the rewinding of the film causes said first counter to count down so that the indicators are actuated in a reverse sequence to indicate the rewinding of the film and the movement of the film in the reverse direction.

* * * * *